(12) United States Patent
Pucheu et al.

(10) Patent No.: US 7,529,223 B2
(45) Date of Patent: May 5, 2009

(54) METHOD AND DEVICE FOR SYNCHRONISING MOBILE TERMINALS ON A RADIO CHANNEL IN DIRECT MODE

(75) Inventors: Gérard Marque Pucheu, Verneuil (FR); Guillaume Pascal, Montigny le Bretonneux (FR); François Piroard, Fontenay aux Roses (FR)

(73) Assignee: Eads Defence and Security Networks, Montigney le Bretonneux (FR)

( * ) Notice: Subject to any disclaimer, the term of this patent is extended or adjusted under 35 U.S.C. 154(b) by 975 days.

(21) Appl. No.: 10/343,382

(22) PCT Filed: Aug. 2, 2001

(86) PCT No.: PCT/FR01/02532

§ 371 (c)(1),
(2), (4) Date: Jan. 30, 2003

(87) PCT Pub. No.: WO02/13419

PCT Pub. Date: Feb. 14, 2002

(65) Prior Publication Data

US 2003/0147367 A1    Aug. 7, 2003

(30) Foreign Application Priority Data

Aug. 3, 2000    (FR) .................................. 00 10259

(51) Int. Cl.
*H04J 3/06* (2006.01)
*H04B 7/00* (2006.01)

(52) U.S. Cl. ...................................... 370/350; 455/518
(58) Field of Classification Search ................. 455/119, 455/463–464, 518–519; 370/332, 337, 350
See application file for complete search history.

(56) References Cited

U.S. PATENT DOCUMENTS

| | | | | |
|---|---|---|---|---|
| 5,636,243 A | * | 6/1997 | Tanaka | 375/219 |
| 6,144,656 A | * | 11/2000 | Kinnunen et al. | 370/347 |
| 6,230,015 B1 | * | 5/2001 | Kinnunen et al. | 455/450 |
| 6,459,690 B1 | * | 10/2002 | Le Strat et al. | 370/332 |

FOREIGN PATENT DOCUMENTS

| | | |
|---|---|---|
| EP | 0 663 737 | 7/1995 |
| GB | 2 290 677 | 1/1996 |
| WO | WO97/07604 | 2/1997 |

OTHER PUBLICATIONS

International Search Report PCT/FR01/02532 dated Nov. 30, 2001.

* cited by examiner

*Primary Examiner*—George Eng
*Assistant Examiner*—Michael Faragalla
(74) *Attorney, Agent, or Firm*—McCracken & Frank LLP

(57) ABSTRACT

Each communication occupying a direct mode channel comprises the transmission between mobile terminals of signals distributed into traffic time slots and into regularly dispersed control time slots during which one of the mobile terminals transmits synchronization and signaling signals. Some of the terminals determine standby time slots aligned with the control slots and continuing after the communication, and place themselves in a receive state on the channel during the aligned standby slots, with idle periods between said standby slots.

12 Claims, 4 Drawing Sheets

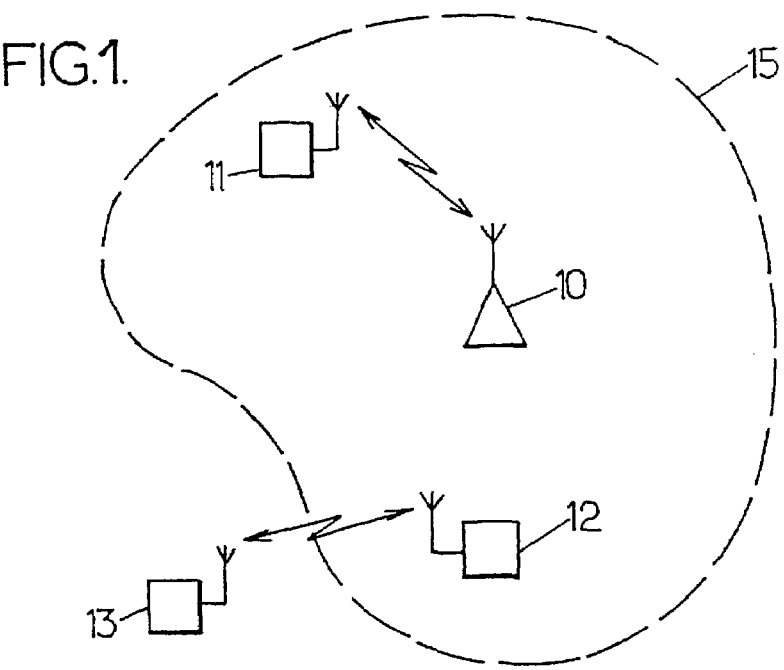

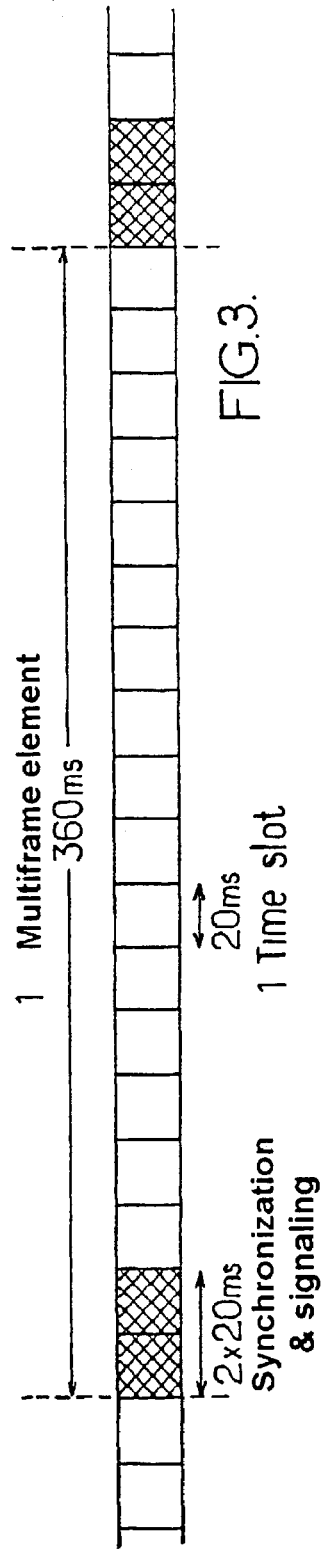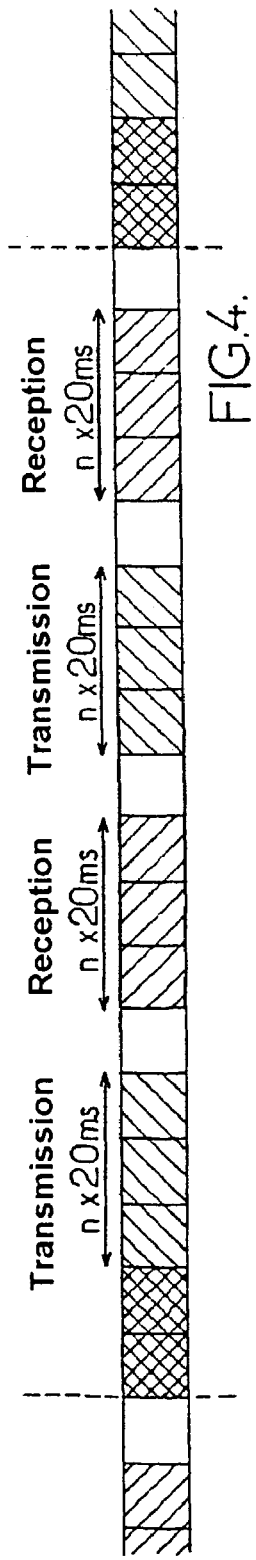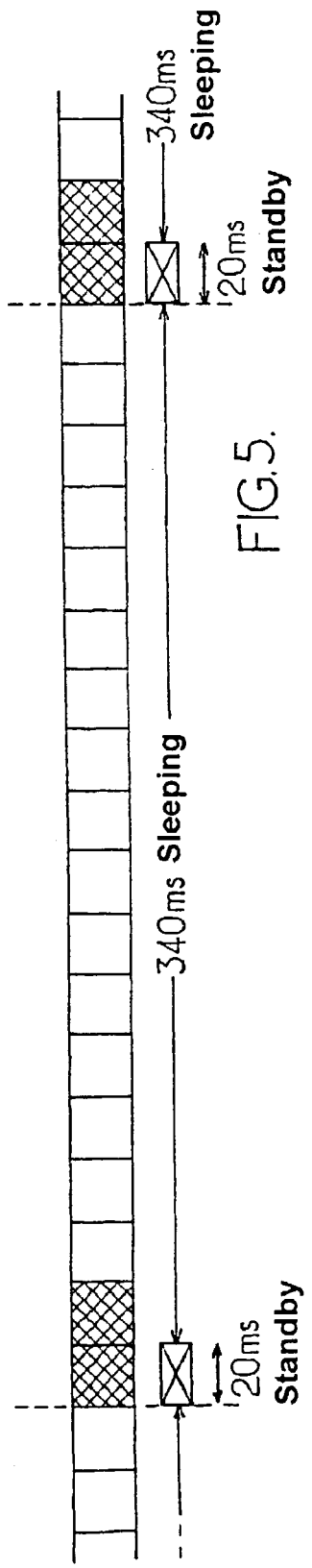

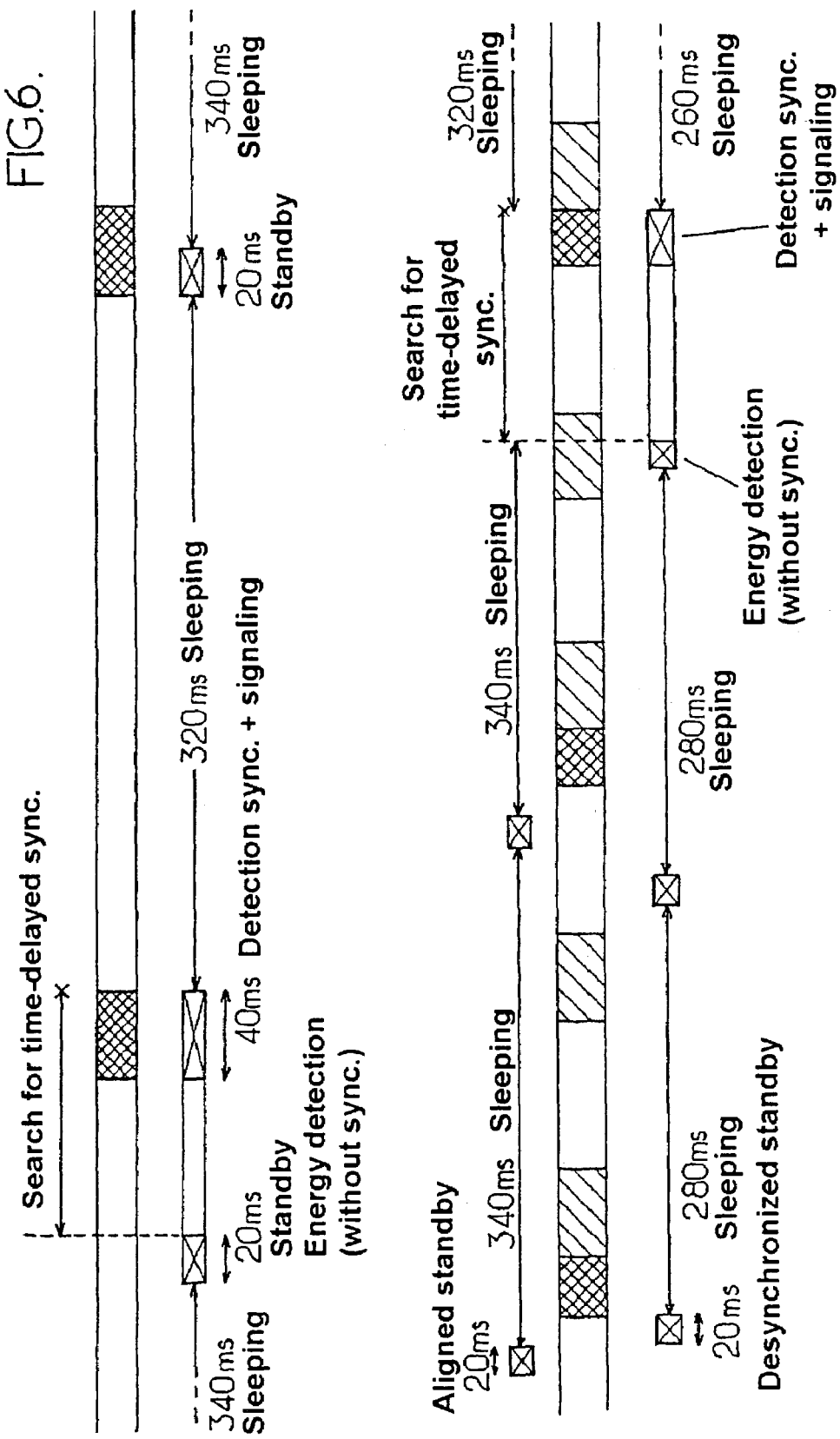

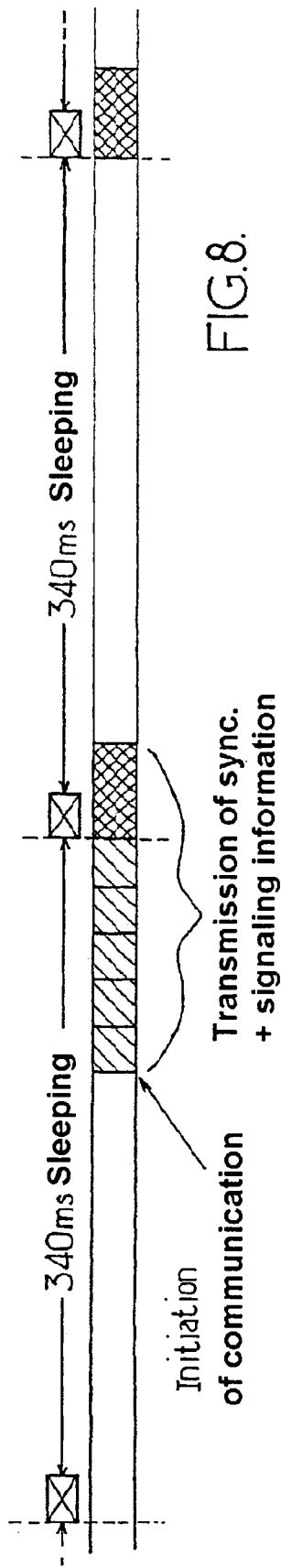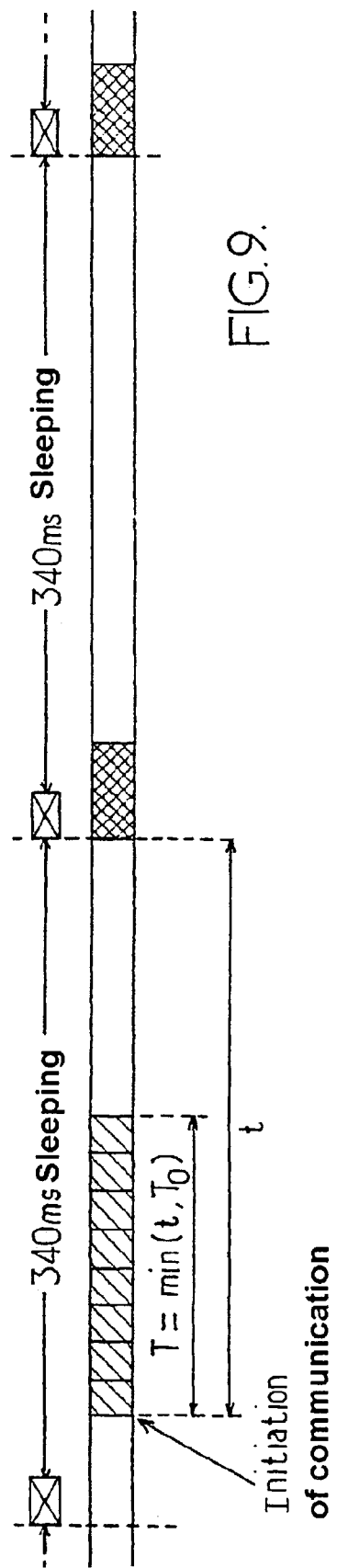

METHOD AND DEVICE FOR SYNCHRONISING MOBILE TERMINALS ON A RADIO CHANNEL IN DIRECT MODE

BACKGROUND OF THE INVENTION

Most professional radiocommunication systems offer a functionality called the direct mode or walkie-talkie mode, which allows mobile radio terminals to communicate with one another outside of the coverage of a network.

This functionality has several uses: it makes it possible to make up for insufficient coverage of the network; it ensures continuity of service in the event of failure or of destruction of the fixed installations of the network; finally, it makes it possible to carry out network independent operations when the required.

The functions available in direct mode are in general more restricted than those available in network mode. One of the functions which is most often absent is the terminal standby function.

The standby function consists, for a terminal which is not communicating, in placing itself from time to time in a receive state so as to examine the state of the channel and to detect any calls relevant to it. For the remainder of the time, the terminal is sleeping so as to limit its energy consumption.

In former analog systems, the absence of a standby function did not present serious drawbacks. Indeed, the consumption of the reception part of the terminal in the absence of any signal was relatively small. Moreover, most of the terminals were automobile mobile terminals whose consumption was not critical.

The digital systems have greater consumption in the reception part, due to the necessary digital processing. With the development of handheld terminals, this makes terminal standby extremely useful.

In the network mode, the infrastructure controls the instants at which the terminals are woken up since it fixes the temporal structure for use of the channels. Synchronization of standby is therefore easily achieved. However, in direct mode, a form of cooperation must be set up between the terminals since the infrastructure may be out of range or nonexistent. Most of the standby mechanisms used in direct mode generally lead to a loss of the start of the communication or to a relatively long setup time.

European patent 0 786 174 describes a system in which base stations of the network supervise the standby function of the terminals both in respect of the radio resources of the network and in respect of the direct mode. This approach is suitable only in the particular case where the terminals are within range of base stations. This case is not the most frequent.

An object of the present invention is to provide an efficient standby mechanism in direct mode, i.e. one which offers a relatively large amount of standby and guarantees a relatively short communication setup time.

It is also desirable for the mechanism to be well adapted to various modes of communication setup: mode without acknowledgment (the most common in direct mode), or modes offering a possibility of acknowledgment, for example by going off-hook after ringing.

SUMMARY OF THE INVENTION

The invention thus proposes a method of synchronizing mobile terminals on a direct mode radio channel, wherein each communication occupying the channel comprises the transmission between mobile terminals of signals distributed into traffic time slots and into regularly dispersed control time slots during which one of the mobile terminals transmits synchronization and signaling signals. According to the invention, some at least of the terminals determine standby time slots aligned with the control slots and continuing after the communication, and place themselves in a receive state on the channel during the aligned standby slots, with idle periods between said standby slots.

Thus, at the end of the communication, all the terminals which have participated in the communication, or which have synchronized themselves with the communication without participating therein, can implement the standby mechanism with mutually synchronized wakeup instants, based on the synchronization of the previous communication.

This synchronous standby mechanism will thus allow them definitely to detect and to monitor any communication set up on this channel and using the same synchronization.

In a preferred embodiment of the method, some at least of the terminals further determine standby time slots which are desynchronized with respect to the control slots, having a different periodicity from that of the control slots and continuing after the communication, and also place themselves in the receive state on the channel during the desynchronized standby slots.

This second offset monitoring by the terminals on standby allows fast detection of any communication not using the same time setting.

In response to the detection on the channel of signals other than synchronization and signaling signals in a standby slot, a mobile terminal remains in the receive state on the channel and determines new standby time slots if it detects synchronization and signaling signals.

This allows the terminal to acquire the synchronization of the direct mode channel if it was previously using another synchronization, in particular if it was disconnected.

Another aspect of the present invention pertains to a control device for a mobile radiocommunication terminal, the terminal comprising means of transmission and of reception on a direct mode radio channel, whereby each communication occupying said channel comprises the transmission between mobile terminals of signals distributed into traffic time slots and into regularly dispersed control time slots during which one of said mobile terminals transmits synchronization and signaling signals. This control device comprises means of activation of the means of reception on the channel during standby slots and of deactivation of the means of reception on the channel outside the standby slots, and means for determining time slots, continuing after the communication, which are aligned with control slots positioned in the course of a communication by detection of synchronization signals transmitted by another terminal and for including said aligned slots in the standby slots.

Another aspect of the present invention pertains to a mobile radiocommunication terminal including such a control device.

BRIEF DESCRIPTION OF THE DRAWINGS

FIG. 1 is a diagram of a radiocommunication system for implementing the invention;

FIG. 2 is a schematic diagram of a mobile terminal according to the invention;

FIGS. 3 to 9 are charts illustrating the organization of a direct mode channel into elements of multiframes and the manner of operation of terminals on this channel.

DESCRIPTION OF PREFERRED EMBODIMENTS

The radiocommunication system represented in FIG. 1 comprises a network whose infrastructure comprises one or more base stations 10. These base stations 10 are capable of setting up radio channels with mobile terminals (11-13).

The system considered is a frequency division multiple access (FDMA) system. A certain number of carrier frequencies are devoted to network mode communications in which the radio transmissions occur between a base station 10 and one or more mobile terminals 11-13.

Another frequency channel is reserved for direct mode communications between the terminals, as illustrated between the terminals 12 and 13 in FIG. 1. A direct mode communication on the frequency channel may occur when one at least of the relevant terminals 13 is outside the coverage area 15 of the network, but this is not compulsory.

In the exemplary embodiment described below, the direct mode channel is organized into successive multiframes each comprising a plurality of 360 ms elements, each composed of 18 time slots of 20 ms (FIG. 3).

When a communication is set up and activated on the direct mode channel, sixteen of these time slots are devoted to the continuous transmission of signals representing coded speech or more generally user traffic (traffic slots), whereas the other two time slots serve for the periodic transmission of signals representing synchronization and signaling information (control slots), as shown by FIG. 3. In each of FIGS. 3 to 9, the time slots drawn with cross-hatching are control slots.

When a dialog is necessary between two terminals, for example for the initiation of a communication in acknowledged mode, the multiframe element still comprises two time slots for the periodic transmission of the synchronization and signaling information by one or other of the terminals, but the remaining time slots are shared statically between the two directions of communication. This is illustrated by FIG. 4 in a particular case where the sharing is performed by alternation of blocks of n=3 time slots of transmission by the terminal transmitting the synchronization and signaling information and of blocks of n=3 time slots of reception by this terminal, with a vacant time slot with each change of direction.

FIG. 2 diagrammatically shows the means with which a terminal 11-13 for communicating on the direct mode channel are equipped (the means relating to the network mode are not drawn).

A duplexer 20 is linked to the antenna 21 of the terminal so as to separate the transmission pathway and the reception pathway which are respectively provided with a radio transmitter 22 and with a radio receiver 23. A controller 24 ensures the sequencing of the transmitter 22 and of the receiver 23 in accordance with the multiframe structure illustrated by FIGS. 3 to 9.

At the output of the radio receiver 23, a demultiplexer 25 distributes the demodulated signal between a module 26 for the control time slots and a vocoder 27 for the traffic time slots. Likewise, in the transmission direction, the controller 24 instructs a multiplexer 28 to send the output signals from the vocoder 27 to the radio transmitter 22 in the traffic time slots, and synchronization and signaling information emanating from the module 26 in the control time slots if the terminal is the one which ensures the broadcasting of this information.

A time base 29 associated with a crystal oscillator supplies the controller 24 with a clock enabling it to obtain the timing of the multiframes and of the 20 ms time slots.

To synchronize the terminal with respect to other terminals engaged in a communication, the module 26 detects the synchronization and/or signaling information dispatched in the control time slots, and supplies a corresponding time marker to the controller 24 which can then instruct the other facilities of the terminal in alignment with the structure of the multiframes.

When a direct mode communication is set up and activated, the channel is occupied by 320 ms sequences of coded speech, intercut with 40 ms sequences, used either for the broadcasting of synchronization and channel state information (characteristics of the communication), or to allow return signaling from the participating terminals to the transmitter terminal (see FIG. 3).

A terminal which has decided not to participate in the communication, nevertheless has knowledge of the synchronization of the communication which has been detected by its module 26. Its controller 24 can then implement a standby mechanism such that it periodically activates the radio receiver 23 so as to monitor part of the information broadcast and thus to ascertain whether the communication is continuing or has terminated. In the example illustrated by FIG. 5, the terminal wakes up during a standby slot of 20 ms every 360 ms, aligned with the first control slot of the multiframe element.

Thus, at the end of the communication, all the terminals which have participated in the communication or which have synchronized with the communication without participating therein can continue to apply the same standby mechanism with mutually synchronized wakeup instants, based on the synchronization of the previous communication.

This synchronization lasts as long as the drifts of the local time bases 29 of each of the terminals do not generate a large offset. The terminals will then be said to be in a synchronized standby state. This standby mechanism will then allow them definitely to detect and to monitor any communication set up on the direct mode channel and using the same synchronization.

In the event of migration or of power-up of a terminal, its standby characteristics are probably not synchronous with those of the terminals which have become neighbors. This terminal will be said to be searching for synchronization, from the point of view of its mutually synchronized neighbors.

In this case, if a new communication is set up, the periodic instants of wakeup of the migrating terminal do not coincide with the instants of broadcasting of the synchronization and channel state information.

However, its receiver 23 can, during its wakeup periods, detect the presence of an energy level above a given threshold, thereby indicating that the channel is occupied by signals relating to a communication in direct mode. The controller 24 thus maintains the terminal in the receive state until a synchronization sequence is detected.

If after decoding of the signaling information accompanying this synchronization sequence, the terminal determines that the communication is relevant to it, the controller 24 will activate the receiver 23 and/or the transmitter 22 in a corresponding manner.

Otherwise, the terminal places itself in a standby state synchronized with the other terminals, in accordance with the mechanism set forth hereinabove. The latter case is that illustrated by FIG. 6.

If the terminal maintained in the receive state after detection of signals other than synchronization and signaling signals in a standby slot does not succeed in subsequently detecting synchronization and signaling signals, it returns to its standby state preceding the expiry of a timeout whose duration may be of the order of that of the multiframe element.

The latter mechanism operates correctly when the communication occupies the entire channel since the continuous transmission by one of the terminals allows definite detection of energy level outside of the control slots.

However, it is not necessarily suitable during the setup phases for a communication in acknowledged mode. In this case, the initiating terminal broadcasts synchronization and channel state information with a periodicity identical to that used for the communications which have been set up, but the remainder of the time comprises a dialog (or an attempted dialog) with the terminal to be contacted, and therefore comprises regular phases of transmission and of reception (or of awaiting reception), as is illustrated in FIG. 4. The time required for the acquisition of synchronization by a non-synchronized terminal, i.e. until one of the wakeup instants coincides with a transmission phase, may then become random, or be excessively lengthened.

This drawback is even more serious when the terminal seeking to synchronize turns out to be precisely the called terminal.

The terminal on standby should then perform a further periodic monitoring desynchronized with respect to the duration of an element of the multiframe, for example by monitoring the channel for an additional standby slot of 20 ms every 300 ms.

Thus, whatever case is envisaged, one of the desynchronized standby slots will quickly coincide with a transmission phase (either periodic synchronization and channel state information or an element of a setup dialog). The terminal can then trigger the time-delayed search for synchronization, and thus attain a synchronized standby state, as illustrated by FIG. 7 where the upper part shows the standby slots aligned with the periodicity of the elements of the control slots and the lower part shows the desynchronized standby slots.

In the case of a change of speaker, there is also a period during which transmission is not continued, and the mechanism illustrated by FIG. 7 also improves the speed of synchronization in this transient situation.

It is noted that in order to favor the detection of energy by the terminal when searching for synchronization, the transmitter can continue to transmit in all the blocks of n time slots which are reserved for it in the multiframe outside of active communication (see FIG. 4). In this case, having regard to the static allocation of the blocks reserved for the initiating terminal, the periodicity of the desynchronized monitorings may be optimized at $(360 \pm n \times p \times 20)$ ms (n and p integers). Specifically, it is not necessary to scan all the blocks of the multiframe.

This mechanism composed of two standby time slots, called aligned standby slots in respect of those corresponding to synchronous standby (every 360 ms) and desynchronized standby slots in respect of the others, allows the terminals in all cases:
- to be in a state of synchronized standby with the neighboring terminals as soon as a communication has taken place; and
- to quickly acquire the same standby synchronization during migration or power-up.

The amount of standby offered by this mechanism is compatible with a good energy saving of the battery since the terminal is in the receive state on average 2 times 20 ms every 360 ms, i.e. around 11% of the time.

Preferably, during the setting up of a communication in non-acknowledged mode, the initiating terminal does not begin sending coded speech immediately, since the terminals which are able to participate in the communication and hence to receive the coded speech may be on standby. An initial setup sequence allowing the terminals on standby to detect the presence of a communication is therefore performed.

Several strategies are possible, according to whether one favors (1) the certainty that the relevant terminals will be present or (2) as fast as possible a switch to communication.

In approach (1), the terminal wishing to initiate the communication begins to transmit synchronization and signaling information throughout the duration separating it from the end of the next aligned standby slot used to wake up all the neighboring terminals, this being the one which it would itself have used for its next wakeup if the communication had not been initiated. As all the terminals wake up at this instant, their switch to communication is ensured (FIG. 8). The same holds for most of the terminals searching for synchronization, whose standby slots, aligned or desynchronized, will often fall during the initial period of transmission of the synchronization and signaling information.

In this case, the communication setup time is 220 ms on average and 400 ms in the worst case.

It will, however, be noted that the coding of the speech can begin before the transmission of the first traffic time slot, thereby reducing the delay perceived by the user.

In approach (2), at the cost of a small probability of losing the first few syllables of the communication, it is possible to further reduce the time to switch to communication by taking account of the desynchronized standby slots. The terminal wishing to initiate the communication in non-acknowledged mode transmits synchronization and signaling information for a duration T, equal to the minimum of the duration t remaining until the next aligned standby slot, and of a fixed duration $T_0$ (FIG. 9).

In this case, all the terminals whose desynchronized standby slot occurs in the course of this transmission of duration T are woken up in time, whereas the other terminals will enter the communication after the first time slot devoted to the periodic sending of the synchronization and signaling information of the multiframe, i.e. at the latest $(360-T_0)$ ms after the start of sending of the coded speech (the traffic loss is then $(360-T_0)$ ms).

It is possible to vary $T_0$ so as to guarantee the best compromise between the average duration of communication setup and the average duration of coded speech loss at the start of communication.

During the setup of a communication in acknowledged mode, it is necessary to ensure the waking up of the terminal to be contacted. The approach (1) above should therefore be adopted. If the terminal to be contacted was not synchronized and if none of the standby slots coincide with the period of initial transmission of the synchronization and signaling information, the transmitter repeats the setup message at predetermined instants corresponding to the blocks of n=3 transmission time slots of FIG. 4, so that it will certainly be received by the terminal on non-synchronized standby at the latest after three secondary standby periods, i.e. 900 ms after the start of setup in the embodiment illustrated by FIG. 7.

The invention claimed is:

1. A method of synchronizing mobile terminals on a direct mode radio channel, wherein each communication occupying the channel comprises the transmission directly between mobile terminals of signals distributed into traffic time slots and into regularly dispersed control time slots on said direct mode channel during which one of the mobile terminals transmits synchronization and signaling signals, the method comprising the steps of determining, based on synchronization and signaling signals transmitted directly between said mobile terminals, by at least some of the terminals standby time slots coincided with the control slots on said direct mode channel and wherein the standby time slots continue to be coincided with the control slots after the communication, and placing said at least some of the terminals in a receive state on the channel during the coincided standby slots, with idle periods between said standby slots, the method further comprising the following steps in response to detection on the channel of signals other than synchronization and signaling signals in a standby slot by a mobile terminal keeping said mobile terminal in the receive state on the channel; determining new standby time slots by said mobile terminal if synchronization and signaling signals are detected; and determining by some at least of the terminals standby time slots desynchronized with respect to the control slots, having a different periodicity from that of the control slots and wherein the standby time slots continue to be coincided with the control slots after the communication, and placing some at least of the terminals in the receive state on the channel during the desynchronized standby slots.

2. The method as claimed in claim 1, comprising the step of keeping said mobile terminal in the receive state on the channel until the expiry of a timeout if no synchronization and signaling signals are detected.

3. The method as claimed in claim 1, further comprising the step of transmitting synchronization and signaling signals until the next coincided standby slot from a mobile terminal to initiate a new communication.

4. The method as claimed in claim 1, further comprising the step of transmitting synchronization and signaling signals from a mobile terminal for a duration equal to a minimum between a predetermined duration and the duration remaining to run until the end of the next coincided standby slot to initiate a new communication in non-acknowledged mode.

5. A control device for a mobile radiocommunication terminal, the terminal comprising means of transmission and of reception on a direct mode radio channel, whereby each communication occupying said channel comprises transmission directly between mobile terminals of signals distributed into traffic time slots and into regularly dispersed control time slots on said direct mode channel during which one of said mobile terminals transmits synchronization and signaling signals, the control device comprising means of activation of the means of reception on the channel during standby slots and of deactivation of the means of reception on the channel outside the standby slots, and means for determining standby time slots coincided with control slots on said direct mode channel positioned in the course of a communication by detection of synchronization signals received directly from another terminal and for including said coincided slots in the standby slots, wherein the standby time slots are arranged to continue to be coincided with the control slots after the communication, wherein the means of activation and of deactivation are arranged to activate the means of reception on the channel until the detection of synchronization and signaling signals in response to detection on the channel of signals other than synchronization and signaling signals in a standby slot, the control device further comprising means for determining time slots desynchronized with respect to the control slots positioned in the course of the communication, having a different periodicity from that of the control slots and wherein the standby time slots are arranged to continue to be coincided with the control slots after the communication and means for including said desynchronized time slots in the standby slots.

6. The control device as claimed in claim 5, wherein the means of activation and of deactivation are arranged to limit the activation of the means of reception on the channel to a predetermined timeout duration in response to detection on the channel of signals other than synchronization and signaling signals in a standby slot.

7. The control device as claimed in claim 5, further comprising means of initiating a new communication, to instruct the means of transmission on the channel to transmit synchronization and signaling signals until the next coincided standby slot.

8. The control device as claimed in claim 5, further comprising means of initiating a new communication in non-acknowledged mode to instruct the means of transmission on the channel to transmit synchronization and signaling signals for a duration equal to the minimum between a predetermined duration and the duration remaining to run until the next coincided standby slot.

9. A mobile radiocommunication terminal, comprising means of transmission and of reception on a direct mode radio channel and a control device, whereby each communication occupying said channel comprises the transmission directly between mobile terminals of signals distributed into traffic time slots and into regularly dispersed control time slots on said direct mode channel during which one of said mobile terminals transmits synchronization and signaling signals, the control device comprising means of activation of the means of reception on the channel during standby slots and of deactivation of the means of reception on the channel outside the standby slots, and means for determining standby time slots coincided with control slots on said direct mode channel positioned in the course of a communication by detection of synchronization signals received directly from another terminal and for including said coincided slots in the standby slots, wherein the standby time slots are arranged to continue to coincided with the control slots after the communication, wherein the means of activation and of deactivation are arranged to activate the means of reception on the channel until the detection of synchronization and signaling signals in response to detection on the channel of signals other than synchronization and signaling signals in a standby slot, wherein the control device further comprises means for determining time slots desynchronized with respect to the control slots positioned in the course of the communication, having a different periodicity from that of the control slots and wherein the standby time slots are arranged to continue to be coincided with the control slots after the communication and means for including said desynchronized time slots in the standby slots.

10. The mobile terminal as claimed in claim 9, wherein the means of activation and of deactivation are arranged to limit the activation of the means of reception on the channel to a predetermined timeout duration in response to detection on the channel of signals other than synchronization and signaling signals in a standby slot.

11. The mobile terminal as claimed in claim 9, wherein the control device further comprises means of initiating a new communication, to instruct the means of transmission on the channel to transmit synchronization and signaling signals until the next coincided standby slot.

12. The mobile terminal as claimed in claim 9, wherein the control device further comprises means of initiating a new communication in non-acknowledged mode to instruct the means of transmission on the channel to transmit synchronization and signaling signals for a duration equal to the minimum between a predetermined duration and the duration remaining to run until the next coincided standby slot.

* * * * *